3,198,730
TREATMENT OF CATALYTICALLY
CRACKED DISTILLATES
Judson E. Goodrich, San Rafael, Calif., assignor to California Research Corporation, San Francisco, Calif., a corporation of Delaware
No Drawing. Filed Mar. 30, 1962, Ser. No. 183,769
2 Claims. (Cl. 208—277)

This application is a continuation-in-part of my copending application Serial No. 88,275, filed February 10, 1961, now Patent No. 3,152,930.

This invention pertains to an improved process for the production of high quality petroleum products. More specifically, this invention relates to the use of a novel solid sulfuric acid catalyst composition for treatment of catalytically cracked hydrocarbon distillates boiling up to and including the gas oil boiling range.

In the production of high quality non-deposit forming petroleum products as, for example, in the production of petroleum products boiling in the motor and heating fuel boiling range, it is known to use a wide variety of treating and refining procedures. These procedures in general are directed toward removing constituents from the fuels which cause harmful results as an aftereffect of the combustion reaction.

While the use of sulfuric acid has produced a satisfactory product in many cases, certain problems exist with respect to its treatment. For example, after the treatment of the distillate, the acid may have to be removed by sodium hydroxide and the petroleum product finished with water. Prior to caustic treatment, the product may require settling or separation of the sulfuric acid and acid-sludge solution with a concomitant large holding vessel.

It has now been found that a new and improved treatment of catalytically cracked distillates is provided by the process which comprises carrying out said treatment in the presence of a microdispersed solid sulfuric acid treating agent prepared by the reaction of an aromatic compound selected from the group consisting of benzene and substituted benzene compounds, said substituents being selected from the class consisting of lower alkyl radicals and phenyl and lower alkyl phenyl radicals; and aldehyde selected from the class consisting of formaldehyde, paraformaldehyde and methylal; and concenterated sulfuric acid; the reaction being carried out by intimately mixing said components in a solvent selected from the group consisting of halogenated hydrocarbons and hydrocarbons, said solvent containing a dispersant and maintaining temperatures not exceeding 120° F.

According to the present invention it is now possible in some applications to eliminate first the sodium hydroxide treatment and the subsequent water washing and removal. Additionally, the acidic resin of the present invention improves color, odor and stability as well as removes nitrogen, oxygen and sulfur. Corrosion problems are also greatly lessened using the sulfuric acid composition of the present invention. Another advantage of the novel solid sulfuric acid composition is the ease with which it can be separated from the petroleum distillates by means such as filtration and gravitational separation (e.g., centrifuging, settling or flow sedimentation).

The novel acidic formolite resins are prepared by reacting an aromatic hydrocarbon, an aldehyde and sulfuric acid.

Suitable aromatic compounds are selected from the class consisting of benzene and mono-, di- or tri- substituted benzenes, naphthalene, alkyl naphthalenes, and phenanthrenes. The substituents are selected from the class consisting of benzene and mono-, di- or tri-substituted benzenes, naphthalene, alkyl naphthalenes, and phenanthrenes. The substituents are selected from the class consisting of benzene and mono-, di- or tri-sub- from 1 to 6 carbon atoms, phenyl radicals and alkyl phenyl radicals. Other compounds are aliphatic and aromatic ethers, e.g. alkyl ethers wherein the alkyl moieties are from 1 to 6 carbon atoms. Benzene and lower alkyl disubstituted monocyclic aromatic compounds are preferred. Examples of aromatic compounds are benzene, n-butyl benzene, toluene, o-xylene, m-xylene, p-xylene, biphenyl, cumene and p-cymene, naphthalene; mono-, di- and trinuclear alkyl ethers such as anisole (methoxybenzene), diphenyl ether; α-methyl naphthalene and phenanthrene.

Suitable aldehydes are selected from the class consisting of formaldehyde, paraformaldehyde, meta-formaldehyde, hemi-formals and monohydroxy or polyhydroxy alcohol reaction product with formaldehyde. Examples of homologous acyclic products are methylal and ethylal. Cyclic reaction products of from 3 to 6 carbon atoms in a ring are included. Examples of suitable cyclic compounds are 1, 3 dioxolanes, 1, 3, dioxanes and higher ring homologues thereof. Formaldehyde is the preferred component.

The strength of sulfuric acid should be above 90 percent. Preferably, the sulfuric acid has a concentration of from 90 to 97% by weight. A dilution effect on sulfuric acid during the reaction should be compensated by using stronger acid or adding stronger acid portionwise.

The mol ratio of formaldehyde to aromatic hydrocarbon may vary from 0.25 to about 2.5. It is desirable to use more than 1.5 mols of formaldehyde per mol of the aromatic constituent. A lesser amount will give lower yields of the resin.

The sulfuric acid is employed in exess over the amount needed for the resin in order that the acidic resin contain active sulfuric acid. From 1 mol to 10 mols of sulfuric acid to 1 mol of aromatic hydrocarbon may be employed.

The preparation of the acidic resin is carried out by intimately mixing the above components in a suitable solvent in the presence of a dispersant. Effective solvents are chlorinated hydrocarbons such as carbon tetrachloride, trichloroethane, trichlorohexane, trichloroheptane. In addition to solubilizing, the solvents serve to minimize the sulfonation of the aromatic compound, thus favoring the resin formation. Other suitable solvents are cracked naphtha and saturated hydrocarbon solvents, such as hexane, heptane, Pearl oil.

The formation of acidic formaldehyde resin proceeds by emulsion resinification mechanism, and, therefore, requires the use of a dispersant as already mentioned. Generally, dispersants which aid in reducing the sulfuric acid droplet size are suitable. Useful dispersants are copolymers such as a condensation product of maleic anhydride and alkyl methacrylate (the ester alkyls are of $C_{10}$ to $C_{18}$ carbon atoms); a copolymer of an alkyl methacrylate and methacrylic acid, and polyglycol methacrylates. The polyglycols are polyethylene glycol, polypropylene glycol and other homologous branched and straight-chain glycols. Examples of suitable polymers are found in U.S. Patents 2,892,779, 2,892,783 and 2,892,818.

Other dispersants are metal sulfonates, such as calcium petroleum sulfonates, or more broadly alkaline metal petroleum sulfonates and alkaline metal alkyl benzene sufonates. Still others are low molecular weight cationic detergents, such as partially dehydrated triamide reaction product of tetraethylene pentamine and branched-chain octadecanoic acid; quaternary alkyl ammonium compounds; alkyl esters of glycerine, and alkenyl succinic anhydride.

The dispersant is used in an amount sufficient to emulsify the sulfuric acid in the solvent. The amount may vary with the particular dispersant employed. Generally, it is from 0.1 to 1.0 volume percent based on the solvent.

In order to synthesize the resinous lattice, catalysts such as sulfuric and hydrofluoric acids are employed. To prepare the acidic formolite resin in one step, an excess amount of sulfuric acid is used. It acts first as a catalyst, while the excess is incorporated in the resinous lattic. If hydrofluoric acid is used initially, sulfuric acid is added subsequently to produce the finished sulfuric acid resin. Sulfuric acid is also used to regenerate the acidic formolite resin to its original strength, if desired.

It is important that the temperature of the reactants be below 120° F. From 35° F. to 120° F. is an acceptable working range. The preferred operating temperature is below about 90° F.

It is essential that the reaction components be thoroughly and intimately mixed during the reaction in order to obtain a finely divided product.

Prior to the present invention the conventional reaction of formaldehyde and aromatic hydrocarbons was described in the art. Products from this reaction are unusable and unadaptable for the present purpose. Nastyukov, J. Russ. Phys. Chem. Soc., vol. 35, p. 824 (1903), called the reaction of formaldehyde and an arene (an aromatic compound) a "formolite reaction," and the products have been called since then "formolite resins."

Two distinct types of resins result from the prior art reaction. One of the resinous products is a high melting substantially oxygen-free resin soluble in most organic solvents and melting at about 200° F. The second product is an infusible resin, generally, insoluble in all common solvents and containing oxygen.

The sulfuric acid formolite resin of this invention is a black granular solid. It picks up moisture the same as sulfuric acid. It can be titrated with a base. When stored in a desiccator for a prolonged period, some $SO_2$ is given off. The indication is that sulfuric acid oxidizes the supporting organic matter. If the sulfuric acid was chemically bound, it would generally not oxidize the support material. Neutralizing the sulfuric acid formolite resin with a base changes its color to tan. In its neutralized state the resin is a talc-like powder, stable up to about 700° F. in air. Above this temperature the resin sinters and darkens. The neutralized benzene formaldehyde resin (the lattice) has a surface area of approximately 110 m.$^2$/gr. According to nitrogen absorption measurements, the individual particles are less than 0.1 micron in diameter, but tend to form clusters several microns in size. The ash content of the neutralized resinous lattice is about 0.1%. Active sulfuric acid up to about 80% by weight is incorporated in the resin. This composition will not attack a filter paper while compositions with higher sulfuric acid content will destroy the paper.

It is not known exactly by what mechanism the sulfuric acid is held in the resinous aromatic-formaldehyde lattice. It appears to be a different mechanism than that of cationic exchange resins, because most polar solvents will elute the labile sulfuric acid from the matrix. Simple hydrocarbon solvents like hexane, however, will not dislodge the sulfuric acid from the resin support. Upon neutralization the acid is removed from the resin.

Because of its organic nature, the acidic formolite resins are restricted to reaction temperatures up to about 500° F. The formolite resin support is inert and does not interfere with the distillate treatment reactions.

Typical preparations of the new sulfuric acid compositions are illustrated in the following examples. Unless otherwise specified, the proportions are on a weight basis.

EXAMPLE I

Carbon tetrachloride (640 ml.), benzene (82.7 g.), concentrated sulfuric acid (686 g. of 95.5–96.5%) and calcium petroleum sulfonate (2 g., derived from a lubricating oil having a viscosity of 480 SSU at 100° F.) were introduced into a vessel and vigorously agitated. 44.0 g. of paraformaldehyde (1.5 mols) was slowly added, keeping the temperature below about 90° F. The product was filtered and washed with benzene. The filtrate was neutral. The acid was all retained in the black solid precipitate. The yield of the wet product was 867.9 g., 11.9% of the product was solvent; 9.2% resin and 78.9% sulfuric acid.

EXAMPLE II

A mixture of 41.4 g. benzene (0.53 mol), 345 g. of 96% sulfuric acid, 1 g. of calcium petroleum sulfonate (derived from lubricating oil having a viscosity of 480 SSU at 100° F.) and 960 ml. of $CCl_4$ were introduced into a vessel having means for vigorous agitation. To the rapidly stirred mixture was added dropwise 60 g. of 38% formaldehyde (0.76 mol). The reaction temperature was kept below about 90° F. The resulting thick reddish-black slurry was filtered and washed with water. The catalyst is then ready for use in the distillate treatment reaction.

EXAMPLE III

A mixture of 44 g. benzene (0.56 mol), 200 ml. of 98% sulfuric acid, 16 ml. of a copolymer of lauryl methacrylate and maleic anhydride having a molecular weight of about 100,000 (25% in $CCl_4$) were introduced into a vessel having means for vigorous agitation. To the rapidly and violently stirred mixture was added dropwise 62.0 g. (0.82 mol) of methylal. The reaction temperature was kept below about 90° F. At the conclusion of the reaction the product was filtered directly through a Fiberglas filter. The filtrate was clear and homogeneous and consisted of about 600 ml. of carbon tetrachloride. The recovered filter residue contained 90.5% of the benzene charged.

Treatment of light natural gasoline, gasolines, diesel fuels, kerosenes, jet fuels and gas oils are within the purview of the invention. Gas oil having an ASTM (D–158–41) boiling point of about 700° F. is the preferred fluid.

A mixture of the above fractions may be treated and then distilled. It is preferred, though, to treat each fraction individually. Better quality distillates are obtained if the lighter fractions are distilled subsequent to the treating operation.

Using the instant acidic formolite resin, contact time can be controlled by the period of agitation with the loose treating agent. If packed beds are used, the depth of the bed allows control of contact time as well as amount of active acidic agent. Generally, the lighter ends are contacted for a shorter period of time. Gasolines may require from a 5 to 120 seconds contact, while gas oils require a longer treatment. Up to about 40 minutes are needed for heavier ends. A packed bed of the acidic formolite resin is also advantageously used as a filter.

Temperature of the treating operation is controlled by the distillate. Lighter ends generally require lower temperatures. From 5° F. to 180° F. is the encountered treating range. Practical temperatures are from 70° to 90° F. From 50° F. to 70° F. is used for gasolines. Cold treatment of gasolines produces best results.

The maximum proportion of acidic formolite resin used is adjusted according to the degree of refining desired and the "burning" characteristics (i.e., undesirable color change) of the distillate. An acid formolite equivalent of from 2 to 75 pounds of sulfuric acid is used per barrel of distillates.

The following examples illustrate typical applications of the new acidic resin in cracked distillate treatment.

EXAMPLE IV

Treatment of catalytically cracked gas oil

A 500 ml. burette was packed with acidic formolite resin. 200 ml. of mixed heptanes were poured into the column and the elutant was drawn off. 1000 ml. of California (Western petroleum stock) catalytically cracked gas oil was charged to the column. The rate of flow was controlled with a stopcock. The elutant was also filtered. The following results were obtained.

ASTM color (D–1500–58T)

Charge stock (California type catalytically cracked
  gas oil boiling in the range from about 410 to
  about 540° F.), 1000 ml., 800 g. _____ 6½
Elutant, first 400 ml. _____ 1½
Elutant, next 510 ml. _____ 1½
90 ml. were left in the column.

Extraction of the impurities from acidic formolite resin

The acidic formolite resin was removed from the column, washed with mixed hexanes, and filtered. 15 ml. of oil was removed from the filtrate. Then 600 ml. of acetone was added to the resin, stirred, and the solution filtered and washed. The acetone solution was added to 1500 ml. $H_2O$ and neutralized with $NH_4OH$. The organic material was extracted with hexanes. After evaporation of hexanes 48.3 g. of dark, strong smelling residue was obtained. The charge stock contained 0.08 percent of nitrogen. Recovered residue from the column contained 1.23 percent nitrogen. The Ehrlich test (see H. Fischer et al., "Die Chemie des Pyrroles," vol. 1, p. 27), of the charge stock and residue from the column gave a positive reading. The elutant from the column, on the other hand, gave a negative reading.

The above example illustrates that treatment of gas oil with the novel acid resin improves its color and removes undesirable nitrogen compounds. The oil storage stability is also improved.

The use of the new acidic formolite resins as treating agent is generally applicable to all petroleum distillates lighter than lubricating oil. Wherever the prior art has encountered problems using sulfuric acid, the treating agent of the present invention now offers an alternative process.

I claim:

1. In the sulfuric acid treatment of cracked petroleum hydrocarbon distillates, the improvement which comprises carrying out said treatment with a microdispersed solid sulfuric acid treating agent in which the sulfuric acid is present as such, said agent being prepared by the reaction of benezene, formaldehyde and concentrated sulfuric acid, the reaction being carried out by intimately mixing said components in a solvent selected from the group consisting of halogenated hydrocarbon solvents, and hydrocarbon solvents, said solvent containing a dispersant and maintaining temperatures not exceeding 120° F.

2. In the treatment of cracked hydrocarbon distillates in accordance with claim 1 the improvement which comprises using 95.5–96.5% concentrated sulfuric acid.

References Cited by the Examiner

UNITED STATES PATENTS

| | | | |
|---|---|---|---|
| 1,827,538 | 10/31 | Nastukoff | 208—277 |
| 2,418,784 | 4/47 | McCormick et al. | 208—277 |
| 2,566,353 | 9/51 | Mills | 208—254 |
| 2,766,178 | 10/56 | Johnstone | 208—254 |

FOREIGN PATENTS

| | | |
|---|---|---|
| 289,920 | 4/28 | Great Britain. |

OTHER REFERENCES

Ellis: The Chemistry of Synthetic Resins, vol. I–II; Reinhold Publishing Corp. (1935); pages 211–214.

ALPHONSO D. SULLIVAN, *Primary Examiner.*